United States Patent [19]
Monnier

[11] Patent Number: 6,082,327
[45] Date of Patent: Jul. 4, 2000

[54] DIRECT-INJECTION SPARK-IGNITION INTERNAL-COMBUSTION ENGINE

[75] Inventor: Gaëtan Monnier, rue Paul Cézanne, France

[73] Assignee: Institut Francais du Petrole, Cedex, France

[21] Appl. No.: 09/274,865

[22] Filed: Mar. 23, 1999

[30] Foreign Application Priority Data

Mar. 26, 1998 [FR] France ................................. 98 03881

[51] Int. Cl.⁷ .................................................. F02B 5/00
[52] U.S. Cl. ............................................ 123/305; 123/298
[58] Field of Search ................................. 123/295, 298, 123/305, 301, 302

[56] References Cited

U.S. PATENT DOCUMENTS

| | | | |
|---|---|---|---|
| 4,216,745 | 8/1980 | Latter et al. | 123/26 |
| 4,232,637 | 11/1980 | Pichard | 123/295 |
| 4,543,929 | 10/1985 | Kataoka et al. | 123/263 |
| 5,327,864 | 7/1994 | Regueiro | 123/260 |

FOREIGN PATENT DOCUMENTS

| | | | |
|---|---|---|---|
| 0824185 | 2/1998 | European Pat. Off. | |
| 36 22 616 | 2/1987 | Germany | 123/305 |
| 19508986 | 4/1996 | Germany | F02F 1/36 |

*Primary Examiner*—Erick R. Solis
*Attorney, Agent, or Firm*—Antonelli, Terry, Stout & Kraus, LLP

[57] ABSTRACT

A direct-injection spark-ignition four-stroke internal-combustion engine includes a combustion chamber (1) delimited by a piston (10), a cylinder and a cylinder head, an intake pipe (2) associated with an intake valve (6), an exhaust pipe (3) with which an exhaust valve (7) cooperates, an ignition element (8) and a fuel injection element (9). According to the invention, the fuel injection element (9) is situated close to the ignition element (8), in the same half of the cylinder head as the exhaust valve (7), the half cylinder itself being placed toward the front of the vehicle. Fuel injection element (9) can be placed below the ignition element (8).

8 Claims, 1 Drawing Sheet

DIRECT-INJECTION SPARK-IGNITION INTERNAL-COMBUSTION ENGINE

FIELD OF THE INVENTION

The present invention relates to the field of spark-ignition four-stroke internal-combustion engines, particularly such engines with direct fuel injection into the combustion chamber.

In this type of engines, the fuel is injected directly into the combustion chamber and not, as in other engines, into the intake pipe(s). Direct fuel injection allows to better control of combustion insofar as the fuel-injection nozzles can react and be controlled according to the engine cycle.

BACKGROUND OF THE INVENTION

Many engines have already been designed to that end. There are thus well-known spark-ignition four-stroke engines with four valves per cylinder, a spark plug situated in the cylinder head on the longitudinal axis of the cylinder, with the cylinder having intake pipes positioned running substantially parallel to the axis of the cylinder, and into which the fuel-injection nozzle opens just below the intake valves.

Also known are engines of the same type but where the intake pipes are positioned so as to produce a motion of the gases around the axis of the cylinder (a motion referred to as swirl).

The piston associated with these engines commonly has a specifically shaped hollow intended to direct and to intensify the motion of the gases in the combustion chamber.

There are also well-known engines whose piston has a spherical bowl (or hollow) situated at the top dead center, just opposite the fuel-injection nozzle and the spark plug.

All these engines have large capacities (cylinder bores rather above 80 mm) and they all have at least four valves per cylinder.

They allow combustion in a stratified mode at low loads and/or so-called homogeneous combustion at high loads.

The combustion is referred to as stratified when a zone of the combustion chamber contains a richer mixture than the rest of the chamber, at low loads. This allows easier ignition of the mixture since the enriched zone is globally close to the spark plug.

At high loads, so-called homogeneous combustion is recommended. The mixture then has to be very homogeneous in the whole of the combustion chamber.

Direct injection engines currently work properly either in one mode or in the other. It is generally difficult to reconcile both operating modes.

In such engines, the size, the accessibility and the cost are important parameters.

SUMMARY OF THE INVENTION

The present invention relates to the type of engine described above and solves some of the associated problems.

More precisely, the present invention allows reduction of the fuel consumption by decreasing the pumping work. Furthermore, heat transfer in and around the combustion chamber is greatly reduced according to the present invention.

The present invention specifically relates to stratified-combustion direct-injection engines having small-sized cylinders.

In such engines, accessibility of the fuel-injection nozzle and of the ignition element must be easy.

The object of the present invention thus to provide is a direct-injection spark-ignition four-stroke internal-combustion engine including at least a combustion chamber delimited by a piston, a cylinder and a cylinder head, an intake pipe associated with an intake element, an exhaust pipe with which an exhaust valve cooperates, an ignition means and a fuel injection element.

According to the invention, the fuel injection element is situated close to and below said ignition means, in the same half cylinder as the exhaust valve, said half cylinder itself being placed toward the front of the vehicle.

According to the invention, the intake valve is situated in the half cylinder that does not contain the exhaust valve.

The exhaust pipe preferably includes, close to the combustion chamber, a bend forming nearly a right angle directed towards the half cylinder that does not contain the exhaust valve, i.e. towards the rear of the vehicle.

According to one of the features of the invention, the intake valve has, near the combustion chamber, a longitudinal axis close to the longitudinal axis of the cylinder.

According to another feature, the profile of the upper face of the piston is similar to that of the lower face of the cylinder head and said piston has a hollow situated close to the area into which the ignition means opens.

Furthermore, the hollow in the piston has a spherical or semi-spherical shape.

The upper face of the piston advantageously has a profile shaped like a roof with two sloping sides whose upper edge delimits the two half cylinders.

According to the invention, the intake valve and the exhaust valve are diametrically opposite each other.

BRIEF DESCRIPTION OF THE DRAWINGS

Other advantages, features and details of the invention will be clear from reading the description hereafter, given by way of non limitative example, with reference to the accompanying drawings wherein.

DETAILED DESCRIPTION OF THE INVENTION

Figure 1:
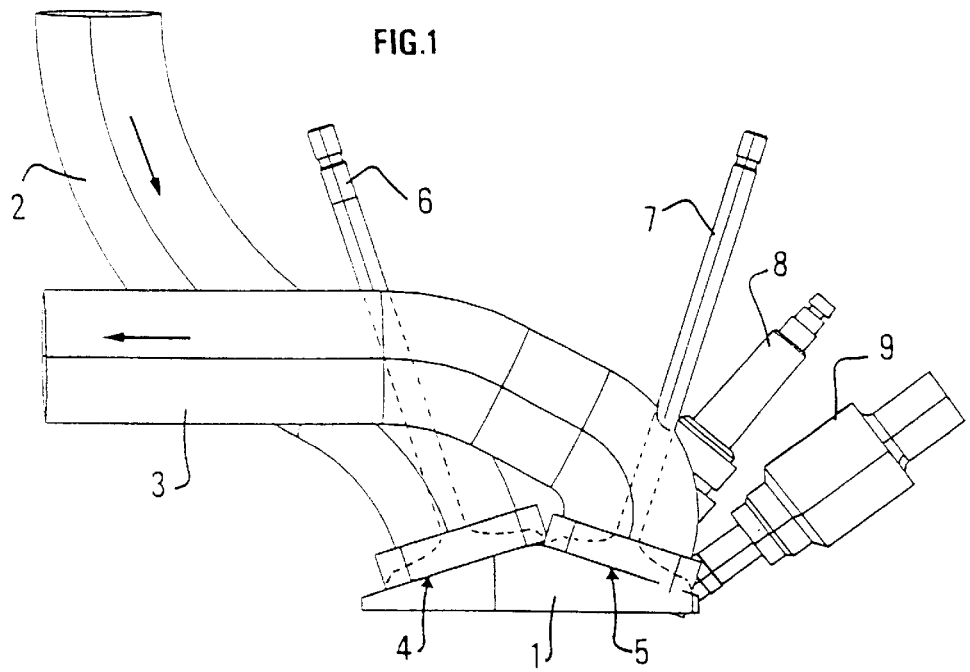
FIG. 1 is a longitudinal view of the upper zone of the combustion chamber and of the cylinder head.

FIG. 1 thus shows the zone of the cylinder head, in the upper part of combustion chamber 1. An intake pipe 2 allows inflow of air into chamber 1, and an exhaust pipe 3 allows discharge of the gases after combustion.

Intake pipe 2 opens into chamber 1 through an intake port 4 and the exhaust pipe, through an exhaust port 5.

The entry of the gases into each port 4, 5 and pipe 2, 3 is controlled by a sealing device such as an intake valve 6 on the intake side and an exhaust valve 7 on the exhaust side.

The motion of each valve is conventionally controlled by an element such as a camshaft (not shown).

Furthermore, an ignition means 8 is mounted in the cylinder head and opens onto the upper part of combustion chamber 1, as well as a fuel injection means 9.

According to the invention, fuel injection element 9 is situated close to ignition means 8, in the same half cylinder as exhaust valve 7. This half cylinder is directed towards the front of the vehicle. Access to fuel-injection nozzle 9 and to ignition means 8 thus is easy. More precisely, fuel-injection nozzle 9 is placed below ignition means 8, which can thus be as close as possible to the top of the combustion chamber.

Figure 2:
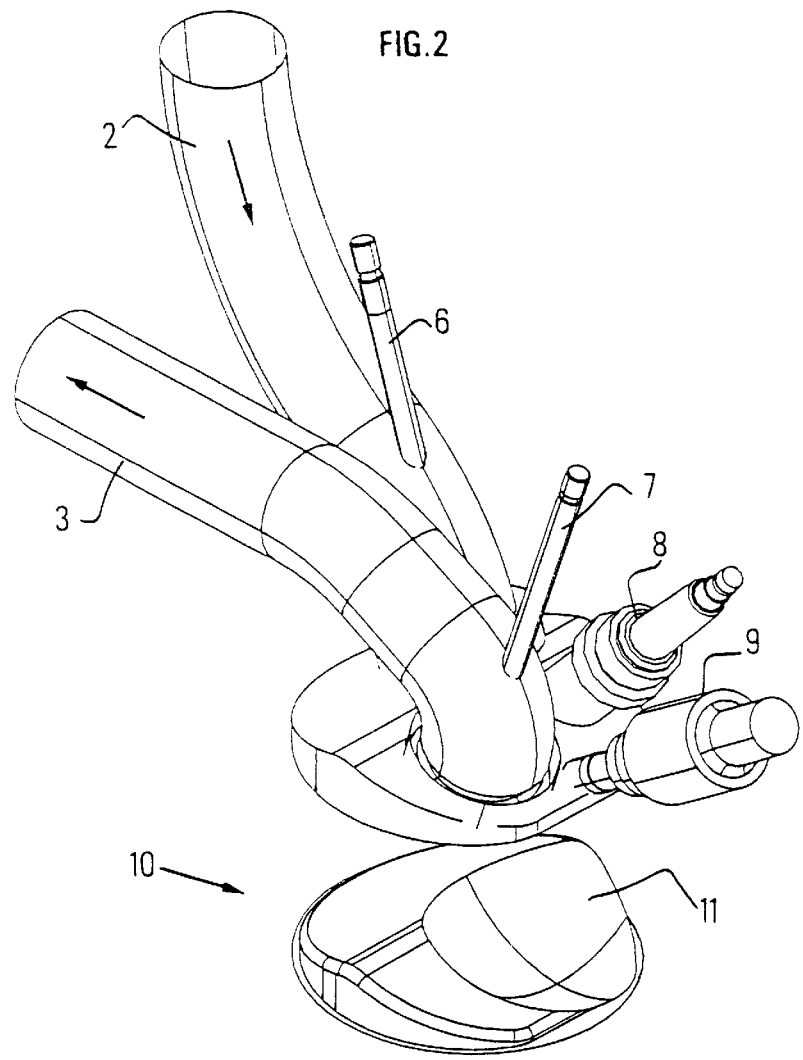
FIG. 2 is a simplified perspective view of an embodiment of the invention.

Moreover, intake valve 6 is placed in the half cylinder that does not contain exhaust valve 7. The two valves are preferably diametrically opposite each other, as shown in the perspective of FIG. 2. A swirling motion can thus be created, i.e. a rotation of the gases around the axis of the cylinder.

The upper face of piston 10 advantageously has a profile similar to that of the lower face of the cylinder head. Piston 10 further comprises a hollow 11 shaped like a sphere portion, placed opposite the zone into which ignition element 8 and fuel-injection nozzle 9 open. This allows better containment of the fuel during late injection, i.e. close to the top dead centre.

In order to transfer the exhaust gas toward the rear of the vehicle while respecting the space requirement constraints under the hood and without installation of the fuel-injection nozzle being hindered by its size, exhaust pipe 3 includes a bend forming nearly a right angle close to the area where it opens into combustion chamber 1. More precisely, the axis of exhaust pipe 3 is first close to the axis of the cylinder, then, over a distance of the order of the diameter of the cylinder, the axis becomes nearly perpendicular to the direction thereof from the combustion chamber.

A quite marked bend is thus obtained, which allows the gas to be driven toward the rear of the vehicle and, moreover, the exhaust pipe to run below the camshaft that can be placed just above the top of the combustion chamber.

Furthermore, the axis of intake pipe 2 is close to the axis of the cylinder in the zone where it opens into combustion chamber 1. Intake pipe 2 can run above the camshaft and thus follow a wide curve eventually leading it toward the front of the vehicle.

The particular layout described above allows, in a small-capacity engine having only two valves:

fuel-injection nozzle 9 to be close to exhaust valve 7, which is generally the smallest valve, nozzle 9 to be centered as much as possible insofar as it is placed next to the smallest valve and as the exhaust pipe runs in the opposite direction, easy access to nozzle 9 and to ignition means 8 since they are placed toward the front side of the vehicle, a single camshaft to be placed above the top of combustion chamber 1 thanks to the particular curvature of intake pipe 2 and exhaust pipe 3.

All the aforementioned devices allow a small-capacity engine with only two valves to have the advantages usually linked with engines of larger capacity having for example four valves per cylinder.

What is claimed is:

1. A direct-injection spark-ignition four-stroke internal-combustion engine comprising a combustion chamber, including a pistons a cylinder with a cylinder head, an intake pipe, an intake valve for controlling flow from said intake pipe into said cylinder, an exhaust pipe, an exhaust valve for controlling flow from said cylinder into said exhaust pipe, an ignition means, and a fuel injection element, wherein said fuel injection element is positioned close to and below said ignition means and in the same half cylinder as said exhaust valve, and wherein close to said combustion chamber, said exhaust pipe has a bend forming nearly a right angle directed towards the half cylinder that does not contain said exhaust valve.

2. An engine as claimed in claim 1, wherein said intake valve is positioned in the half cylinder that does not contain said exhaust valve.

3. An engine as claimed in claim 1, wherein near said combustion chamber said intake pipe has a longitudinal axis close to the longitudinal axis of said cylinder.

4. An engine as claimed in claim 1, wherein the upper face of said piston has a profile similar to that of the lower face of said cylinder head and further has a hollow situated close to the area onto which said ignition means opens.

5. An engine as claimed in claim 4, wherein the hollow in said piston has a spherical or semi-spherical shape.

6. An engine as claimed in claim 1, wherein the upper face of said piston has a profile like a roof, with two slopes whose upper edge delimits the two half cylinders.

7. An engine as claimed in claim 1, wherein said intake valve and said exhaust valve (7) are positioned diametrically opposite each other.

8. An engine as claimed in claim 1, wherein said fuel injection element is positioned in the half cylinder toward the front of the vehicle.

* * * * *